No. 872,933. PATENTED DEC. 3, 1907.
E. HAMILTON.
DRAG.
APPLICATION FILED MAR. 11, 1907.

2 SHEETS—SHEET 1.

Witnesses
J. Milton Jester
C. H. Griesbauer

Inventor
E. Hamilton
by H. B. Willson & Co.
Attorneys

No. 872,933.
PATENTED DEC. 3, 1907.
E. HAMILTON.
DRAG.
APPLICATION FILED MAR. 11, 1907.
2 SHEETS—SHEET 2.
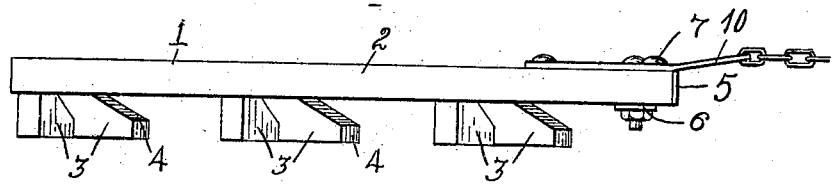
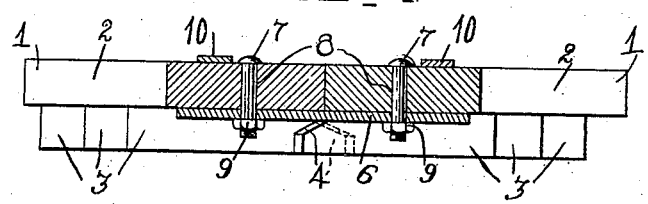
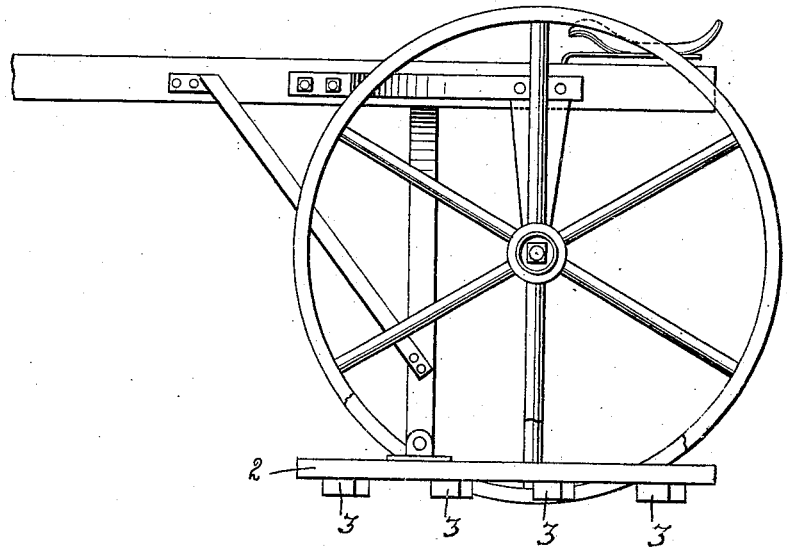
Witnesses
J. Milton Jester
C. H. Griesbauer
Inventor
E. Hamilton
by H. B. Willson & Co.
Attorneys

UNITED STATES PATENT OFFICE.

EDWARD HAMILTON, OF WINCHESTER, ILLINOIS.

DRAG.

No. 872,933.　　　Specification of Letters Patent.　　　Patented Dec. 3, 1907.

Application filed March 11, 1907. Serial No. 361,816.

*To all whom it may concern:*

Be it known that I, EDWARD HAMILTON, a citizen of the United States, residing at Winchester, in the county of Scott and State of Illinois, have invented certain new and useful Improvements in Drags; and I do declare the following to be a full, clear, and exact description of the invention, such as will enable others skilled in the art to which it appertains to make and use the same.

This invention relates to improvements in drags.

The object of the invention is to provide a device of this character by means of which the surface of the ground may be leveled off and pulverized and by means of which all weeds will be destroyed.

A further object is to provide a drag adapted to be applied to an ordinary straddle row cultivator for use in cultivating corn or other plants, whereby the surface of the ground will be broken and cultivated without danger of pulling up or disturbing the roots of the plants.

With the above and other objects in view, the invention consists of certain novel features of construction, combination and arrangement of parts, as will be hereinafter described and claimed.

Figure 1:
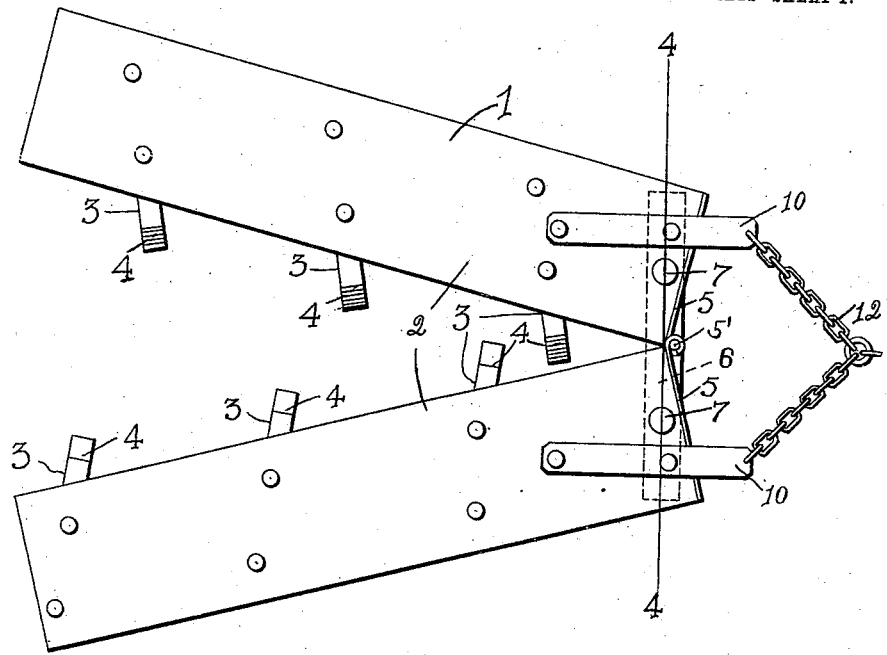
Figure 2:
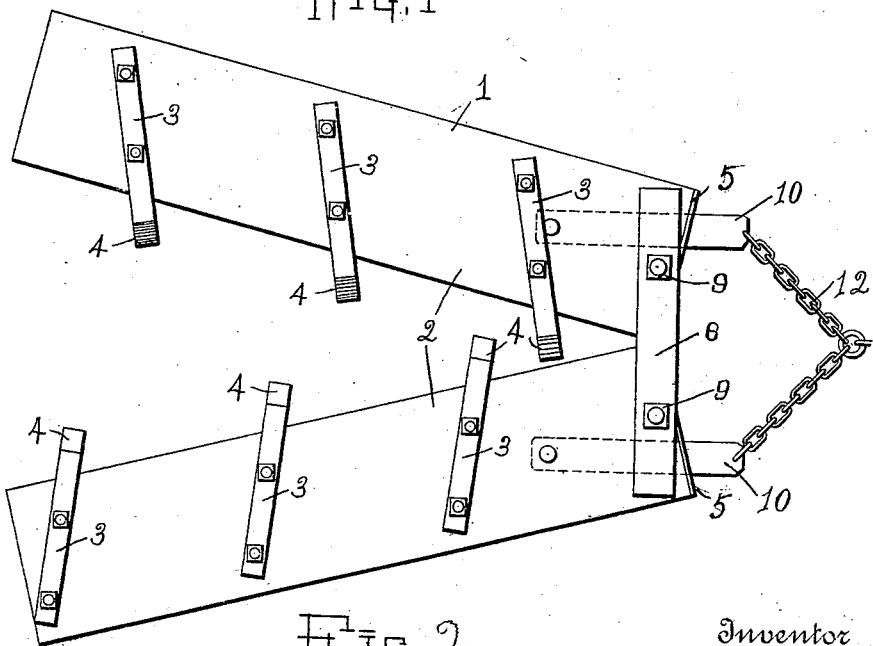

In the accompanying drawings:—Figure 1 is a top plan view of a drag constructed in accordance with the invention; Fig. 2 is a bottom plan view of the same; Fig. 3 is a side view of the drag; Fig. 4 is a vertical cross sectional view on the line 4—4 of Fig. 1; and Fig. 5 is a side view, showing the manner in which the drag may be applied to a wheeled cultivator frame in place of the shovels or disks usually carried thereby.

Referring more particularly to the drawings, 1 denotes the drag which consists of a pair of boards or plates 2, on the under side of each of which is secured a series of transverse, obliquely - disposed cleats 3. The cleats 3 project beyond the inner sides of the boards or plates 2, as shown at 4. The projected ends of the cleats 3 are preferably beveled, as shown.

In the construction shown in Figs. 1 to 4 of the drawings, the plates or boards 2 of the drag are hingedly connected together at their forward ends by means of a hinge comprising leaves or straps 5 attached to the ends of the boards and pivotally connected by means of a pintle 5', said plates being also loosely connected at their forward ends by an underlying cross bar 6 to which they are pivoted by upwardly projecting bolts 7 which pass through apertures 8 formed in the ends of the plates. Nuts 9 are applied to the pivoting bolts for holding the parts in connected relation. The apertures 8 may, if necessary, be of sufficient size to permit play of the bolts, thus to obviate possible binding between the pivots 7 and 5'.

Connected to the upper sides of the forward ends of the plates or boards 2 are forwardly-projecting, diverging draw bars 10, the outer ends of which are connected by a draft chain 12 to which the draft devices are connected. By providing the draw bars 10 and the chains 12 and arranging the same as herein shown and described, the plates or boards 2 will be spread apart at their rear ends to a greater or less degree, this spreading of the boards being in a measure controlled by the resistance offered to the cleats by the ground. The distance apart at which the rear ends of the plates or board 2 are spread or separated is controlled not only by the above mentioned resistance, but also by the length of the draft chain connecting the outer ends of the draw bar, thus providing for the quick adjustment of the drag for various kinds of work by varying the length of the chain.

In Fig. 5 of the drawings is shown the manner in which the drag may be applied to an ordinary wheeled straddle row cultivator. When the drag is applied to a cultivator, as shown in this figure, the boards or plates 2 are separated and each of the same is independently attached to the frame of the cultivator in any suitable manner and takes the place of the cultivator shovels or disks usually attached thereto. The drag when thus arranged provides an efficient cultivator by means of which rows of corn or other plants may be cultivated and the ground leveled and pulverized without danger of uprooting plants.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is:—

1. A drag comprising a pair of boards, a series of cleats arranged on the under side thereof and projecting at an angle from one side thereof, substantially as described.

2. A drag comprising a pair of boards, a series of cleats arranged on the under side of said boards, and means whereby the boards are hingedly-connected together at their forward ends, substantially as described.

3. A drag comprising a pair of boards, a series of cleats on the under sides of said boards and arranged transversely thereto, a hinge to connect the forward ends of said boards, and means connected to the latter whereby when the same are drawn over the ground the rear ends of the boards will be spread apart, substantially as described.

4. A drag comprising a pair of boards, hingedly-connected at their forward ends, a series of obliquely-arranged cleats secured to the under sides of said boards and projecting beyond the inner edges thereof, forwardly-projecting draft bars connected to the forward ends of said boards, and a draft chain connected to the outer ends of said draw bars, substantially as described.

5. A drag comprising a pair of boards hingedly connected at their forward ends and pivotally-connected to a cross-bar arranged under the forward ends thereof, a series of obliquely-disposed cleats secured across the under sides of said boards, forwardly-projecting diverging draw bars connected to the forward ends of said boards, and a draft chain connected to the outer ends of said draw bars, substantially as described.

In testimony whereof I have hereunto set my hand in presence of two subscribing witnesses.

EDWARD HAMILTON.

Witnesses:
WILLIAM JOSEPH DODGSON,
EDWARD J. PIEPER.